(12) United States Patent
Guok et al.

(10) Patent No.: US 9,268,568 B2
(45) Date of Patent: Feb. 23, 2016

(54) METHOD AND APPARATUS FOR AGENT INTERFACING WITH PIPELINE BACKBONE TO LOCALLY HANDLE TRANSACTIONS WHILE OBEYING ORDERING RULE

(75) Inventors: Ngek Leong Guok, Sitiawan (MY); Kah Meng Yeem, Folsom, CA (US); Poh Thiam Teoh, Seri Damansara (MY); Su Wei Lim, Klang (MY)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 13/997,628

(22) PCT Filed: Nov. 9, 2011

(86) PCT No.: PCT/US2011/060039
§ 371 (c)(1),
(2), (4) Date: Jun. 24, 2013

(87) PCT Pub. No.: WO2013/070217
PCT Pub. Date: May 16, 2013

(65) Prior Publication Data
US 2013/0283013 A1   Oct. 24, 2013

(51) Int. Cl.
*G06F 3/00* (2006.01)
*G06F 13/00* (2006.01)
*G06F 9/30* (2006.01)
*G06F 13/14* (2006.01)
(Continued)

(52) U.S. Cl.
CPC ............ *G06F 9/30043* (2013.01); *G06F 13/14* (2013.01); *G06F 15/163* (2013.01); *H04L 69/12* (2013.01)

(58) Field of Classification Search
None
See application file for complete search history.

(56) References Cited

U.S. PATENT DOCUMENTS

| 4,481,625 | A | * | 11/1984 | Roberts et al. | ................. 370/464 |
| 5,805,930 | A | * | 9/1998 | Rosenthal et al. | ............... 710/57 |
| 6,205,506 | B1 | | 3/2001 | Richardson | |

(Continued)

FOREIGN PATENT DOCUMENTS

KR       100253753        4/2000

OTHER PUBLICATIONS

International Search Report and Written Opinion for PCT Application No. PCT/US2011/060039 dated Jun. 5, 2012, 6 pages.

(Continued)

*Primary Examiner* — Idriss N Alrobaye
*Assistant Examiner* — Richard B Franklin
(74) *Attorney, Agent, or Firm* — Blakely, Sokoloff, Taylor & Zafman LLP

(57) ABSTRACT

In accordance with embodiments disclosed herein, there are provided methods, systems, and apparatuses for enabling an agent interfacing with a pipelined backbone to locally handle transactions while obeying an ordering rule including, for example, receiving a transaction which requests access to a backbone; decoding routing destination information from the transaction received, in which the decoded routing destination information designates the transaction to be processed either locally or processed via the backbone; storing the decoded routing destination information and the transaction into a First-In-First-Out (FIFO) buffer; retrieving the decoded routing destination information and the transaction from the FIFO buffer; and processing the transaction locally or via the backbone based on the decoded routing destination information retrieved from the FIFO buffer with the transaction.

18 Claims, 6 Drawing Sheets

(51) Int. Cl.
*G06F 15/163* (2006.01)
*H04L 29/06* (2006.01)

(56) References Cited

U.S. PATENT DOCUMENTS 7,219,193 B2 * 5/2007 Inoue et al. ............ 711/117
8,539,446 B2 * 9/2013 Kaur ...................... 717/121

2003/0233388 A1 12/2003 Glasco et al.
2010/0266115 A1 10/2010 Fedorov et al.

OTHER PUBLICATIONS

International Preliminary Report on Patentability for Application No. PCT/US2011/060039 dated May 13, 2014, 5 pages.

* cited by examiner

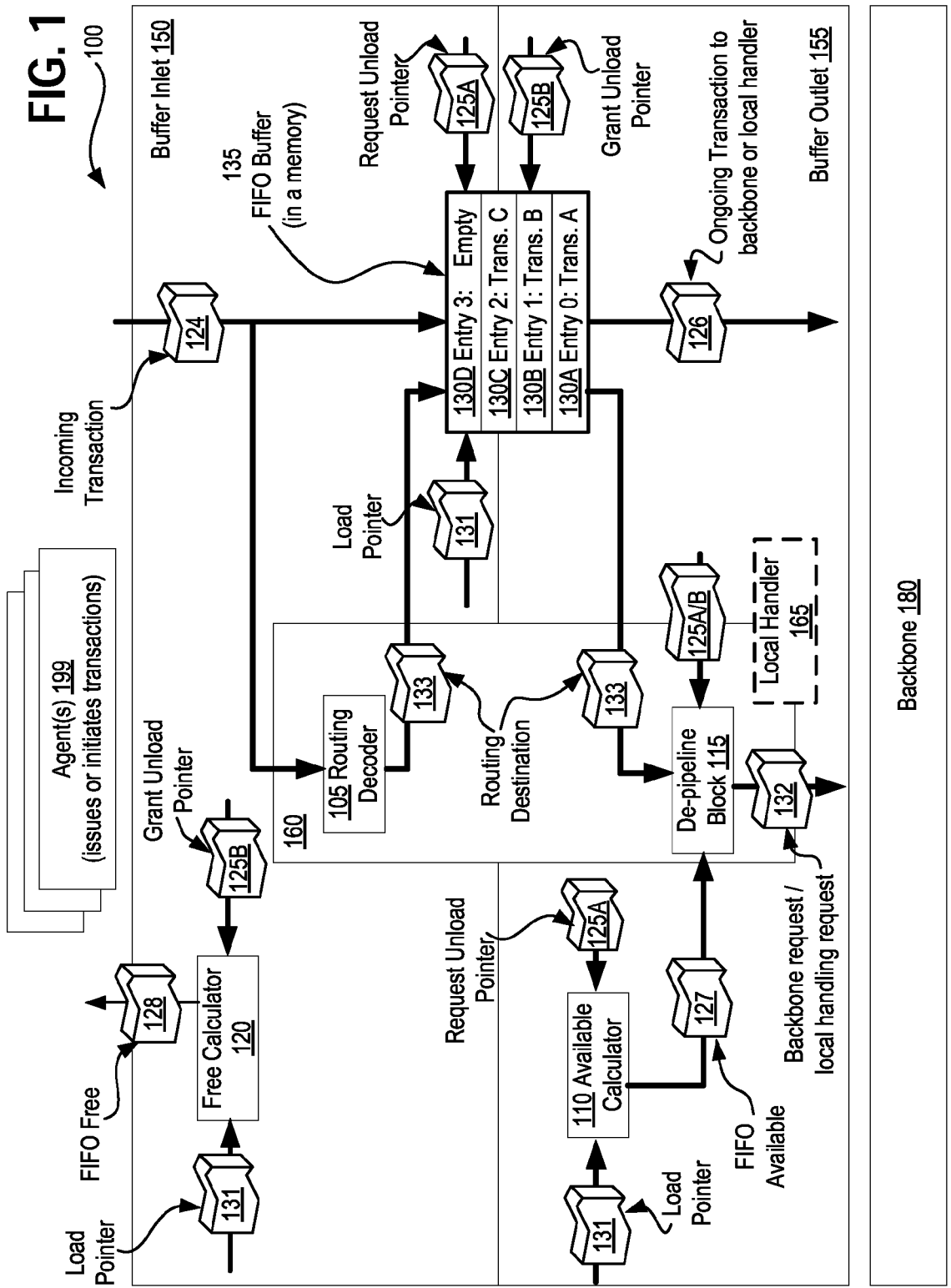

Start

↓

Waiting for a new transaction to be received. 405

↓

Receiving a transaction which requests access to a backbone. 410

↓

Determining whether the FIFO buffer has an empty entry slot capable to receive and buffer a new incoming transaction. 415

↓

Decoding routing destination information from the transaction received, in which the decoded routing destination information designates the transaction to be processed either locally or processed via the backbone. 420

↓

Storing the decoded routing destination information and the transaction into a First-In-First-Out (FIFO) buffer. 425

↓

Incrementing a Load Pointer to cause the Load Pointer to point to a next one of the plurality of entry slots in the FIFO buffer responsive to the storing. 430

↓

Retrieving the decoded routing destination information and the transaction from the FIFO buffer. 435

↓

Processing the transaction via the backbone by retrieving a command and data for processing the transaction and communicating the command and the data for processing the transaction to the backbone. 440

↓

Determining there are no outstanding transactions yet to be granted by the backbone based on a Request Unload Pointer and a Grant Unload Pointer being equal. 445

↓

Processing the transaction locally by de-pipelining the received transaction when there are determined to be no outstanding transactions yet to be granted by the backbone consuming the received transaction locally without engaging the backbone. 450

↓

Incrementing a Grant Unload Pointer and a Request Unload Pointer to cause each Pointer to point to a next one of the plurality of entry slots in the FIFO buffer responsive to the reading. 455

↓

End

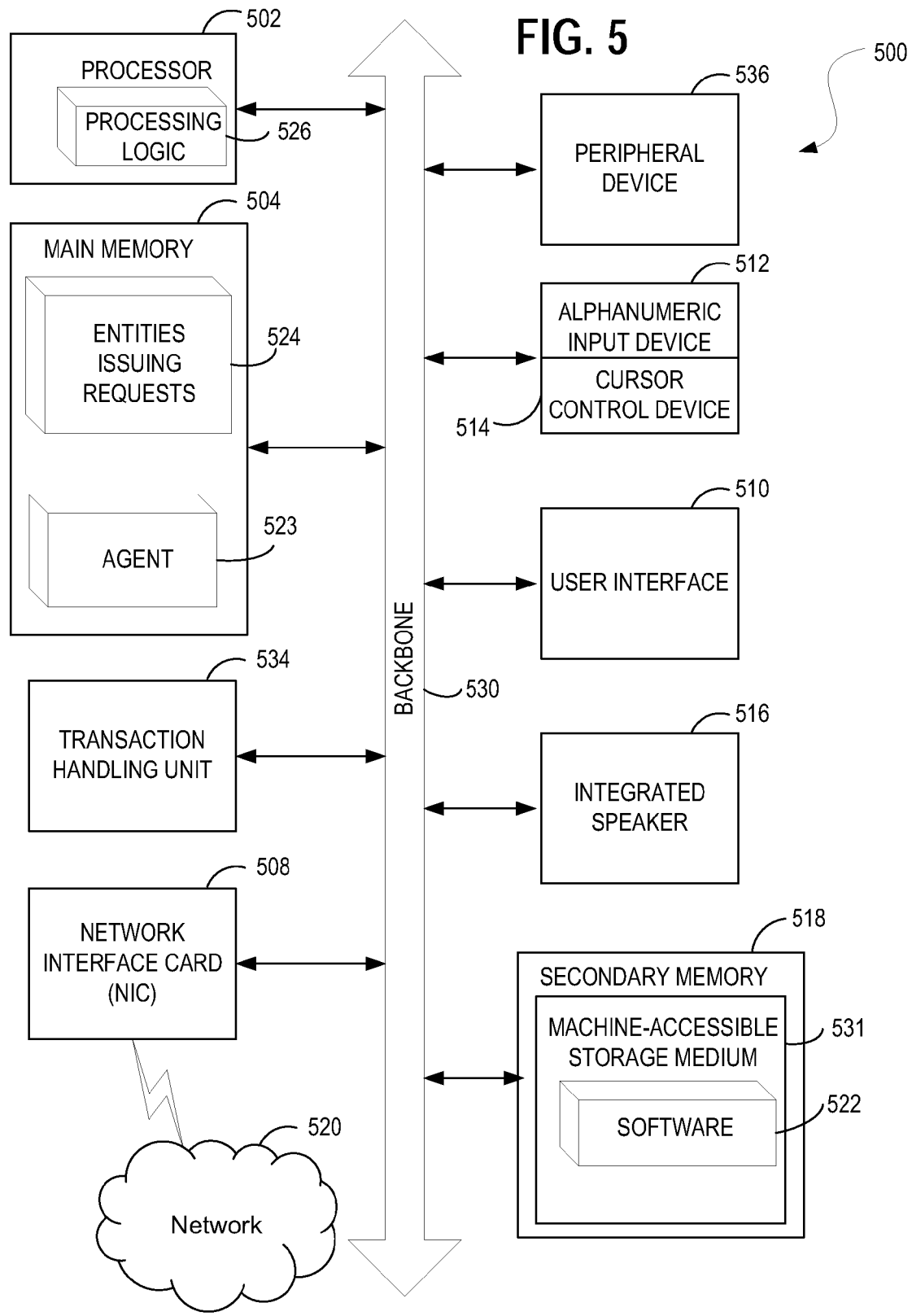

METHOD AND APPARATUS FOR AGENT INTERFACING WITH PIPELINE BACKBONE TO LOCALLY HANDLE TRANSACTIONS WHILE OBEYING ORDERING RULE

CLAIM OF PRIORITY

This application is a U.S. National Phase application under 35 U.S.C. §371 of International Application No. PCT/US2011/060039, filed Nov. 9, 2011, entitled METHOD AND APPARATUS FOR AGENT INTERFACING WITH PIPELINE BACKBONE TO LOCALLY HANDLE TRANSACTIONS WHILE OBEYING ORDERING RULE, the entire contents of which are incorporated herein by reference.

TECHNICAL FIELD

Embodiments relate generally to the field of computing, and more particularly, to enabling an agent interfacing with a pipelined backbone to locally handle transactions while obeying an ordering rule.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to disclosed embodiments.

In the field of computing, systems implement pipelined backbone protocols to separate issuance of transactions by an agent. Issued transactions are typically separated into two phases: (1) requests by agent, and (2) grant by backbone. Such pipelined backbone protocols allow an agent to present multiple requests to a backbone for the same request channel, regardless of whether or not previous requests have been granted by the backbone. Each phase (e.g., request or grant) is able to make forward progress independent of other phases, thus allowing for high speed transaction transmission. Grants by the backbone within the same request channel are typically required to follow the order of the request presented by the agent to the backbone. One exemplary pipelined backbone protocol is the Intel On-Chip System Fabric (IOSF).

However, such a model becomes problematic for transactions which are to be handled locally, either being discarded or consumed by the agent itself, as such local handling interferes with the ordering requirement for grants by the backbone.

The present state of the art may therefore benefit from systems, mechanisms, and methods for enabling an agent interfacing with a pipelined backbone to locally handle transactions while obeying an ordering rule as described herein.

BRIEF DESCRIPTION OF THE DRAWINGS

Embodiments of the present invention are illustrated by way of example, and not by way of limitation, and can be more fully understood with reference to the following detailed description when considered in connection with the figures in which:

FIG. 1 depicts an exemplary transaction handling structure for agents on a pipelined backbone, in accordance with which embodiments may operate;

FIG. 4 is a flow diagram illustrating a method for enabling an agent interfacing with a pipelined backbone to locally handle transactions while obeying an ordering rule in accordance with one embodiment; and FIG. 5 illustrates a diagrammatic representation of a machine in the exemplary form of a computer system, in accordance with one embodiment.

DETAILED DESCRIPTION

Figure 2A:
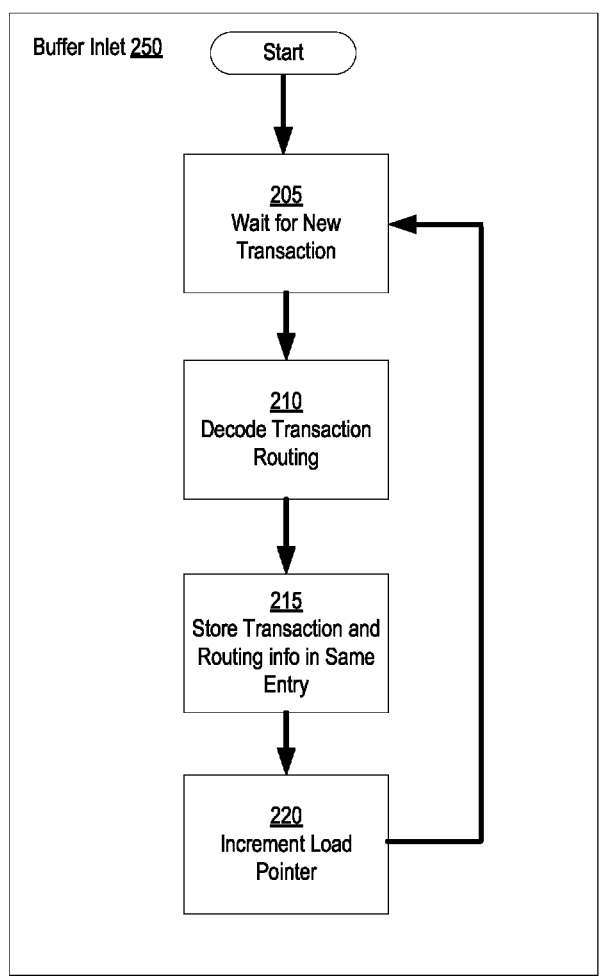
FIG. 2A depicts an exemplary operational environment having a de-pipeline mechanism buffer inlet and associated operations in accordance with disclosed embodiments.

Described herein are methods, apparatuses, and systems for enabling an agent interfacing with a pipelined backbone to locally handle transactions while obeying an ordering rule. For example, disclosed herein are mechanisms to discard or consume any transactions for an agent, such as a bridge, which sits on a pipelined backbone, while also maintaining an ordering requirement for the backbone.

Practice of the disclosed embodiments provides a solution to address ordering issues between locally handled cycles and cycles routed to a backbone. Such ordering issues arise with a pipelined backbone protocol's capability of presenting multiple requests to a backbone while taking advantage of the high-performance pipelined backbone.

In accordance with one embodiment, methods, systems, and apparatuses for enabling an agent interfacing with a pipelined backbone to locally handle transactions while obeying an ordering rule include, for example, receiving a transaction which requests access to a backbone; decoding routing destination information from the transaction received, in which the decoded routing destination information designates the transaction to be processed either locally or processed via the backbone; storing the decoded routing destination information and the transaction into a First-In-First-Out (FIFO) buffer; retrieving the decoded routing destination information and the transaction from the FIFO buffer; and processing the transaction locally or via the backbone based on the decoded routing destination information retrieved from the FIFO buffer with the transaction.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled with a computer system bus or backbone. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary transaction handling structure 100 for agents on a pipelined backbone, in accordance with which embodiments may operate.

To achieve a pipelined backbone protocol, a FIFO buffer 135 is utilized to store all transactions (e.g., incoming transaction 124) presented for processing via the backbone 180. A buffer inlet 150 writes or stores incoming transactions 124 into the FIFO buffer 135, and a buffer outlet 155 for the FIFO buffer 135 may be in communication with the pipelined backbone 180. Unloading of the FIFO buffer 135 is performed by having two different unload pointers, a Request Unload Pointer 125A for the request phase and a Grant Unload Pointer 125B for the grant phase. Each pointer may therefore progress independently.

The FIFO buffer 135 as depicted is implemented in a memory and includes multiple slots 130A-D for storing pointers. For example, depicted is slot 0 at element 130A identified as transaction "A" and slot 1 at element 130B identified as transaction "B" and slot 3 at element 130C identified as transaction "C" and lastly slot 3 at element 130D which is presently empty and is thus not identified with a transaction. Load Pointer 131 (Entry 3 at element 130D) and Request Unload Pointer 125A (Entry 3 at element 130D) and Grant Unload Pointer 125B (Entry 1 at element 130B) of the FIFO buffer 135 are further depicted. Load Pointer 131 is pointing to the empty slot at Entry 3 130D after having loaded transactions "A" through "C" into Entries 0 through 2 (130A-C) respectively.

Request Unload Pointer 125A is then pointed to Entry 3 130D after presenting all 3 transactions' requests (transactions A, B, and C) to the backbone 180. As depicted, backbone 180 has sent transaction "A" to the target as Grant Unload Pointer 125B is depicted as pointing to Entry 1 130B for transaction "B."

There are certain transactions issued or initiated by an agent 199 which are preferably not sent to the backbone 180. For example, it may be preferable that such transactions be locally handled (e.g., via local handler 165) due to various reasons. Local handling may include, for example: (1) a Discard operation—unsupported transactions are discarded without being sent to the target through backbone; or (2) a Consume operation—transactions are consumed by agent 199, and thus, need not be directed to a target through the backbone 180.

FIFO buffer 135 may implement a transaction command buffer having, for example, a write port and a read port. The FIFO buffer 135 is implemented as a First-In-First-Out (FIFO) buffer. Such a FIFO buffer 135 stores an incoming transaction 124 or an incoming transaction command from the agent 199 or from any other interface enabled to issue and submit transactions for processing via the backbone 180. A Load Pointer 131 tracks each transaction command's load entry into the FIFO buffer 135. An unload pointer called a Request Unload Pointer 125A tracks the incoming request 124 that has been presented to backbone 180. An unload pointer called Grant Unload Pointer 125B tracks the incoming transaction 124 that has been granted backbone 180, and which is then sent to the backbone 180 as granted transaction 126 (e.g., an "ongoing transaction" 126) depicted as leaving or exiting the FIFO buffer 135 for processing via backbone 180 (e.g., routing to a target or accessing resources accessible via the backbone, etc.). The ongoing transaction or granted transaction as denoted by element 126 corresponds to the incoming transaction 124, but is distinguished in that incoming transaction 124 is entering the FIFO buffer 135 at buffer inlet 150 and ongoing transaction 126 is depicted as exiting the FIFO buffer 135 at buffer outlet 155, for example, to be processed via local handler 165 or backbone 180 as appropriate.

Further depicted is a de-pipelining mechanism 160 within which a routing decoder 105 decodes the routing destination 133 of the transaction being processed, such as incoming transaction 124. The routing destination 133 tracks whether to route the incoming transaction 124 to the backbone 180 or determines that the incoming transaction 124 is to be handled locally via local handler 165. Decode of the routing destination 133 may be performed by reading the command information of the incoming transaction 124 received. The routing destination 133 is stored into the FIFO buffer 135 along with its corresponding transaction 124, side-by-side, in an available slot 130A-D. For example, slot 130D of the FIFO buffer 135 may be loaded with the routing destination 133 as determined based on the incoming transaction 124 side-by-side with the incoming transaction 124. Although the determination and storing of the routing destination is depicted as being done within the buffer inlet 150 section, such function may permissibly be performed within the buffer outlet 155 section. For example, Routing decoder 105 may alternatively be located within buffer outlet 155 and perform decoding as transactions 124 are read from the next available slot of the FIFO buffer 135 for presentment to the backbone 180 or for local handling.

The de-pipelining mechanism 160 further includes de-pipeline Block 115 which interprets routing destination 133 information in order to allow pipelining when transactions (e.g., ongoing transaction 126) are to be routed to the backbone 180 by asserting a Backbone Request indication operation. Conversely, ongoing transactions 126 to be handled locally are de-pipelined by the de-pipeline block 115 by asserting a Local Handling Request operation. A backbone request/local handling request 132, as appropriate, is thus output from the de-pipeline block 115 to be transacted via the backbone 180 or handled locally without requiring grant or access to the backbone 180.

A de-pipeline decoder may further be utilized by the de-pipeline block 115 which compares a Request Unload Pointer 125A and Grant Unload Pointer 125B (e.g., 125A/B input into the de-pipeline block 115) to determine that each are equal so as to ascertain that there are no outstanding transactions yet to be granted by the backbone 180, thus resulting in de-pipelining of the transactions.

Further depicted is a free calculator 120 within the buffer inlet 150 which reports whether FIFO buffer 135 slots 130A-D are free, and thus, capable of receiving and buffering new transaction requests on behalf of an agent 199 or other entity issuing transactions 124. For example, free calculator 120 tracks or counts Grant Unload Pointers 125B and tracks or counts Load Pointer 131 operations, and based on the counts, returns FIFO free 128 information when necessary.

Within the buffer outlet 155, available calculator 110 reports whether any of the FIFO buffer 135 slots 130A-D are filled with a transaction by tracking or counting Request Unload Pointers 125A and tracking or counting Load Pointer 131 operations, and based on the counts, returns FIFO available 127 information when necessary, for example, providing FIFO available 127 information to the de-pipeline block 115 enabling the de-pipeline block 115 to implement its own comparison as described above with regard to a de-pipeline decoder implemented by the de-pipeline block 115.

Thus, in accordance with one embodiment, a transaction (e.g., incoming transaction 124) is received at the buffer inlet 150, in which the transaction 124 requests access to a backbone 180. In such an embodiment, routing decoder 105 decodes routing destination information 133 from the transaction 124 received, in which the decoded routing destination information 133 designates the transaction 124 to be processed either locally or processed via the backbone 180. In such an embodiment, the decoded routing destination information 133 and the transaction 124 are stored in a First-In-First-Out (FIFO) buffer 135 and the decoded routing destination information 133 and the transaction 124 are retrieved from the FIFO buffer 135. In such an embodiment, the transaction (e.g., representing incoming transaction 124 or ongoing transaction 126 now ready for processing) is processed locally (e.g., via local handler 165) or processed via the backbone 180 based on the decoded routing destination information 133 retrieved from the FIFO buffer 135 with the ongoing transaction 126.

In one embodiment, processing the transaction locally includes determining the transaction 124 does not require routing to the backbone 180 based on the decoded routing destination information 133 and presenting the transaction 124 to a local handler 165 without engaging the backbone 180. In one embodiment, processing the transaction 124 locally further includes determining there are no outstanding transactions 124 yet to be granted by the backbone 180 based on a Request Unload Pointer 125A and a Grant Unload Pointer 125B being equal. In such an embodiment, processing the transaction 124 locally further includes de-pipelining the received transaction 124 when there are determined to be no outstanding transactions 124 yet to be granted by the backbone 180 and consuming the received transaction 124 locally without engaging the backbone 180.

In one embodiment, consuming the transaction 124 locally includes one of (1) discarding the received transaction 124 as an unsupported transaction without the received transaction 124 being sent to a target through the backbone 180, and (2) consuming the received transaction 124 by an agent 199 which initiated the received transaction 124 without directing the received transaction 124 to the target through the backbone 180.

In one embodiment, receiving the transaction 124 which requests access to the backbone 180 includes receiving the transaction 124 at a transaction handler (e.g., such as transaction handling unit 301) from an agent 199 communicatively interfaced with the transaction handler, in which the agent 199 resides within one of: (a) a PCI Express attached device issuing the transaction to the transaction handler for presentment to the backbone; (b) a serial ATA attached device issuing the transaction to the transaction handler for presentment to the backbone; (c) a Platform Controller Hub attached device issuing the transaction to the transaction handler for presentment to the backbone; and (d) a Direct Media Interface (DMI) attached device issuing the transaction to the transaction handler for presentment to the backbone 180.

In one embodiment, the transaction 124 is received from a first agent 199 among a plurality of agents 199, the transaction specifying the command and data to be processed via the backbone 180 and a second transaction is received from a second agent 199 among the plurality of agents 199, the second transaction specifying a second command and second data to be processed via the backbone, and a de-pipelining mechanism 160 writes a Load Pointer 131 into the FIFO buffer 135 for each of the first transaction 124 and the second transaction 124 (e.g., each being an incoming transaction 124) in the order in which the first and second transactions 124 are received. In such an embodiment, the de-pipelining mechanism 160 forces the first transaction 124 and the second transaction 124 to be processed locally or via the backbone 180 in the order the first transaction 124 and the second transaction 124 are received by the de-pipelining mechanism 160 regardless of the routing destination information 133 associated with each of the first and second transactions 124.

In one embodiment, the FIFO buffer 135 includes a memory having a plurality of entry slots 130A-D, in which each of the plurality of entry slots 130A-D stores a respective routing destination information 133 entry and a corresponding received transaction 124 for each of a plurality of incoming transactions 124 received.

In one embodiment, storing the decoded routing destination information and the transaction into the FIFO buffer constitutes writing the decoded routing destination information 133 and the transaction 124 into one of a plurality of entry slots 130A-D in the FIFO buffer 135 and responsively incrementing a Load Pointer 131 to cause the Load Pointer 131 to point to a next one of the plurality of entry slots (e.g., 130D among 130A-D) in the FIFO buffer 135.

In one embodiment, retrieving the decoded routing destination information and the transaction from the FIFO buffer constitutes reading the decoded routing destination information 133 and the transaction 124 from one of a plurality of entry slots in the FIFO buffer 135 responsively incrementing a Grant Unload Pointer 125B to cause the Grant Unload Pointer 125B to point to a next populated one of the plurality of entry slots (e.g., 130B among 130A-D) in the FIFO buffer 135.

In one embodiment, a free calculator 120 determines whether the FIFO buffer 135 has an empty entry slot (e.g., 130D among 130A-D) capable to receive and buffer a new incoming transaction 124. Available calculator 110 checks the FIFO buffer 135 to determine whether any ongoing transaction 126 in the FIFO buffer 135 is available to be processed by the De-pipeline Block 115, which then in turn routes the available ongoing transaction 126 to the backbone 180 or to the local handler 165 to be consumed.

In one embodiment, storing the decoded routing destination information 133 and the transaction 124 into the FIFO buffer 135 constitutes storing the decoded routing destination information 133 and the transaction 124 into the FIFO buffer 135 and into the empty slot 130D of the FIFO buffer 135 when the FIFO buffer is determined to have the empty slot 130D.

In one embodiment, processing the transaction 124 via the backbone 180 includes retrieving a command and data for processing the transaction 124, communicating the command and the data for processing the transaction 124 to the backbone, and incrementing a Request Unload Pointer 125A to point to a next populated one of a plurality of entry slots 130A-D in the FIFO buffer 135.

FIG. 2A depicts an exemplary operational environment 200 having a de-pipeline mechanism buffer inlet and associated operations in accordance with disclosed embodiments.

Buffer inlet 250 implements a series of operations beginning with the Wait for New Transaction 205 operation to await a new transaction, such as incoming transaction 124, within the buffer inlet 250. Flow then proceeds to the Decode Transaction Routing 210 operation for decoding the routing destination 133 information as described above via, for example, a routing decoder 105. Flow then proceeds to the Store Transaction and Routing Information in the Same Entry 215 operation which writes or stores both the decoded routing destination information 133 and also the incoming transaction 124 into an available slot (e.g., one of 130A-D) of the FIFO buffer 135. Flow then proceeds to the Increment and Load Pointer 220 operation to increment the Load Pointer 131 so that it points to a next available slot 130A-D within the FIFO buffer in preparation for the next incoming transaction 124. Flow then returns to the Wait for New Transaction 205 operation for processing of a new incoming transaction 124 or to await the arrival of a new incoming transaction 124.

Figure 2B:
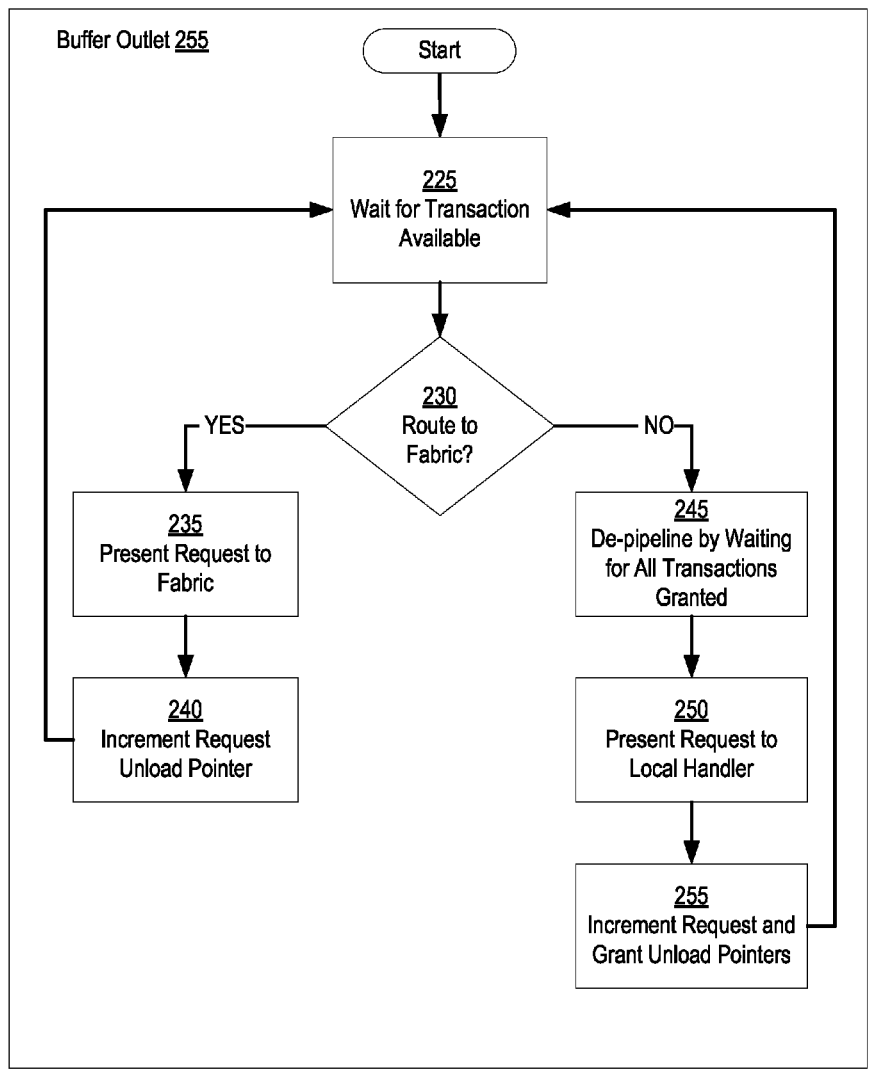
FIG. 2B depicts an exemplary operational environment having a de-pipeline mechanism buffer outlet and associated operations in accordance with disclosed embodiments.

FIG. 2B depicts an exemplary operational environment 201 having a de-pipeline mechanism buffer outlet and associated operations in accordance with disclosed embodiments.

Buffer outlet 255 implements a series of operations beginning with the Wait for Transaction Available 225 operation which waits for an ongoing transaction 126 to appear at the buffer outlet 255. For example, operation 225 may be implemented by a clock-crossing buffer. A transaction is considered available whenever there is difference between Load Pointer 131 and Request Unload Pointer 125A as determined by available calculator 110. Flow then proceeds to the Route to Fabric 230 decision point. The transaction's routing destination 133 information pointed to by Request Unload Pointer 125A is decoded to determine whether the ongoing transaction 126 is supposed to be sent to the backbone 180 or is supposed to be locally handled. When "YES," the ongoing transaction 126 is supposed to be sent to the backbone 180, then flow proceeds to the Present Request to Fabric 235 operation, and the backbone request 132 for the ongoing transaction 126 is presented or submitted to the backbone 180.

Pipelining may occur at this point because the backbone request 132 for the ongoing transaction 126 is presented to backbone without considering whether there remains any transaction still waiting for a grant from the backbone 180, assuming backbone request 132 is allowed by the backbone's 180 pipelining depth availability. Flow next proceeds to the Increment Request Unload Pointer 240 operation to increment the Request Unload Pointer 125A so that it points the next slot 130A-D within the FIFO buffer 135. After operation 240, flow returns to the Wait for Transaction Available 225 operation to retrieve and process a waiting available ongoing transaction 126 from the FIFO buffer 135 or to wait until such an ongoing transaction 126 becomes available.

From the "NO" branch of the Route to Fabric 230 decision point, flow alternatively proceeds to the De-pipeline by Waiting for All Transactions Granted 245 operation. For ongoing transactions 126 to be locally handled, de-pipelining of the ongoing transaction 126 is performed by determining that all prior transactions routed to the backbone have been thoroughly consumed by backbone 180. For example, such an assurance or determination may be made by verifying that Request Unload Pointer 125A equals Grant Unload Pointer 125B, for example, via a comparator such as the de-pipeline decoder at the de-pipeline block 115 as described above. Flow then proceeds to the Present Request to Local Handler 250 operation, which is now acceptable because ordering is now ensured. Flow next proceeds to the Increment Request and Grant Unload Pointers 255 operation to increment the Request Unload Pointer 125A and to increment the Grant Unload Pointer 125B, for example, advancing each to the next slot of the FIFO buffer 135. Flow then returns to the Wait for Transaction Available 225 operation to retrieve and process a waiting available ongoing transaction 126 from the FIFO buffer 135 or to wait until such an ongoing transaction 126 becomes available.

Practice of the disclosed embodiments enables pipelining of transactions that are to be sent to backbone 180, thus ensuring performance optimization is still achieved for such transactions when an agent 199 is communicably interfaced to high performance pipelined backbone. The de-pipeline mechanism further permits any transactions that are to be locally handled to be processed without violating an ordering rule for such transactions. For example, de-pipelining enables an ordering rule which requires that transactions be granted and processed by the backbone 180 in the same order of presentment to the backbone 180, to be obeyed, despite a subset of such transactions being handled locally.

Practice of the disclosed embodiments may therefore provide operational benefit to implementations such as Platform Controller Hubs for use in mobile, desktop and server systems, Direct Media Interface (DMI) implementations, PCI Express and Serial-ATA implementations, etc, thus optimizing performance of transaction transfer on a pipelined backbone for transactions that are routed to the backbone 180.

Practice of the disclosed embodiments avoids the undesirable alternative to simply not fully utilize a backbone's 180 pipelining capability in order to obey a required or enforced ordering rule when locally handling certain transactions. Further still, practice of the disclosed embodiments promotes a cost-effective implementation to locally handle cycles while maintaining compatibility with an interface to a high performance pipelined backbone 180. The disclosed solution utilizes Request Unload Pointer 125A and Grant Unload Pointer 125B as inputs to a comparator which provides an inexpensive and computationally simplistic means to assess whether there are outstanding transactions yet to be granted by the backbone 180, thus permitting de-pipelining of certain transactions for local handling.

The de-pipelining mechanism further provides the flexibility of allowing any amount of latency to locally handle a cycle that may arise due to factors like number of data phases of the cycle.

Figure 3:
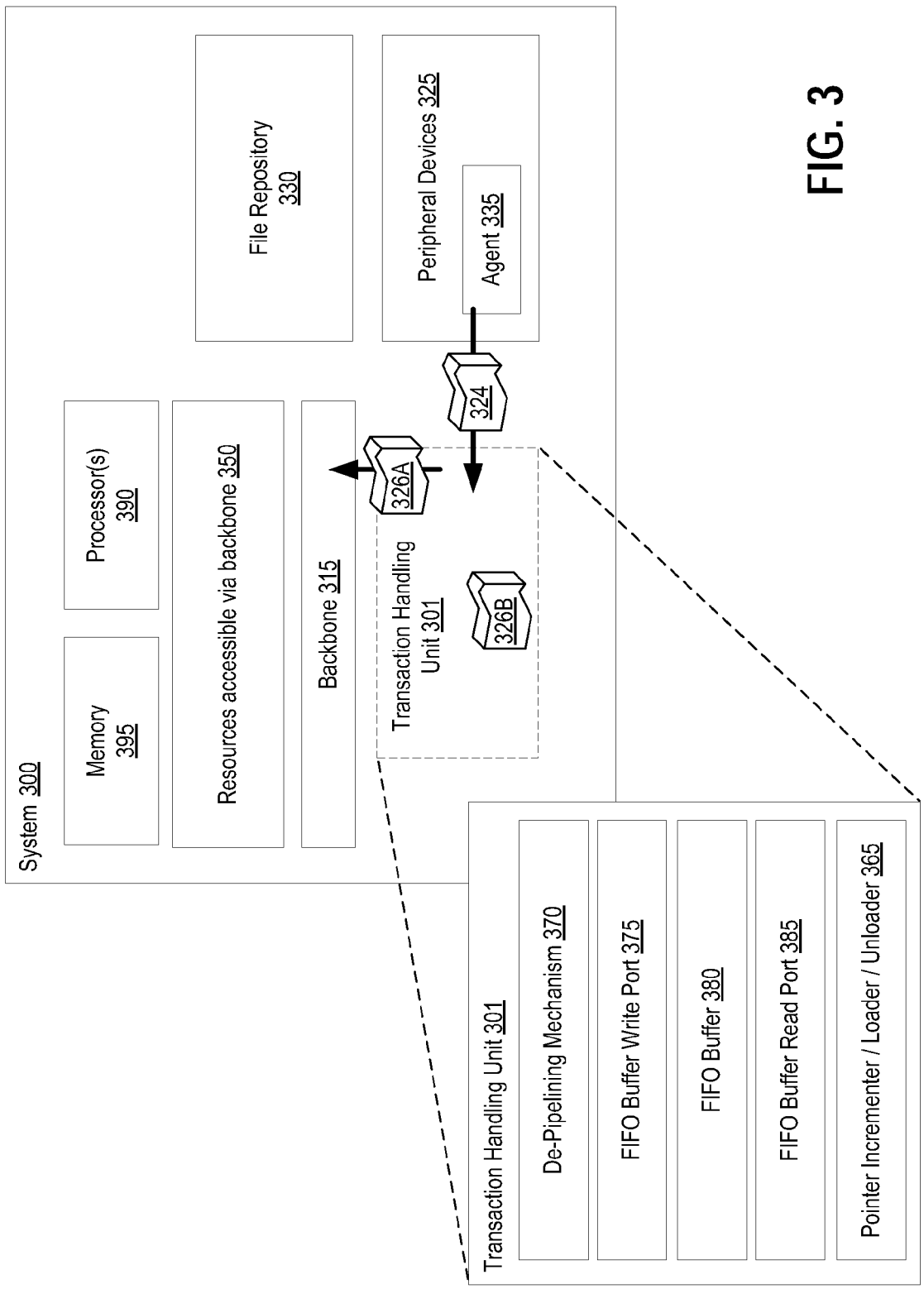
FIG. 3 shows a diagrammatic representation of a system in which embodiments may operate, be installed, integrated, or configured, in accordance with one embodiment.

FIG. 3 shows a diagrammatic representation of a system 300 in which embodiments may operate, be installed, integrated, or configured, in accordance with one embodiment.

In one embodiment, system 300 includes a memory 395 and a processor or processors 390. For example, memory 395 may store instructions to be executed and processor(s) 390 may execute such instructions. System 300 includes backbone 315 to transfer transactions and data within system 300 among a plurality of peripheral devices communicably interfaced with backbone 315. System 300 further includes peripheral devices 325, for example, to issue requests and transactions to a backbone or to receive requests, commands, data, etc., as processed through such a backbone. An agent 335 within each of the peripheral devices 325 of the system 300 may accept such requests and pass them to a transaction handling unit 301 for presentment to the backbone as appropriate. As depicted, incoming transaction 324 is passed to the transaction handling unit 301. Some transactions are passed to a backbone and other transactions are consumed or processed locally by the transaction handling unit 301 without engaging the backbone. For example, outgoing transaction 326A is depicted as being passed to the backbone 315 for processing. Outgoing transaction 326B is depicted as being processed within or local to the transaction handling unit 301, for example, via a local handler 165, such as that shown with regard to FIG. 1. Requests from the peripheral device master(s) may specify resources available via a backbone 350.

File repository 330 provides storage as necessary for the system 300, for example, to store defined instructions, business logic, implementing logic for the system 300, etc.

Distinct within system 300 is the transaction handling unit 301 which includes a de-pipelining mechanism 370, a FIFO buffer write port 375, a FIFO buffer 380, for example, implemented in a memory, a FIFO buffer read port 385, and a pointer Incrementer/Loader/Unloader 365. Any or all of the components of the transaction handling unit 301 may be hardware based, such that each is enabled by the hardware of system 300 in conjunction with the system 300's processor(s) 390 and memory 395 to carry out the described capabilities. In accordance with one embodiment, the de-pipelining mechanism 370 determines routing destination information by reading an incoming transaction request, and then causes the routing destination information and the corresponding incoming transaction request to be stored within a free slot of the FIFO buffer 380. De-pipelining mechanism 370 further operates to determine whether transactions are to be presented to the backbone or handled internally based on the routing destination information. De-pipelining mechanism 370 may further make an assessment whether there are any outstanding transactions yet to be granted by the backbone 180 before commencing with a de-pipelining operation.

The FIFO buffer write port 375 writes the routing destination information and the transaction into memory upon which the FIFO buffer 380 resides. The FIFO buffer 380 implements a first-in-first-out buffer for multiple incoming grant requests being originated, issued, and submitted for presentment to the backbone. The FIFO buffer read port 385 reads ongoing transaction requests out of the FIFO buffer 380 for consumption via a backbone or for local handling based on the routing destination information determined previously. Element 365 provides a pointer incrementer, a pointer loader, and a pointer unloader, for transacting with the FIFO buffer 380. For example, to increment Request Unload Pointers 125A, to increment Grant Unload Pointers 125B and to perform Load Pointer 131 operations as necessary for processing requests and grants and further for enforcing adherence to an ordering rule.

Thus, in accordance with one embodiment, such an apparatus includes a First-In-First-Out (FIFO) buffer 380 implemented via a memory of the apparatus, in which the FIFO buffer 380 has a plurality of entry slots. Such an apparatus further includes a FIFO buffer write port 375 to write a received transaction and routing destination information decoded from the received transaction into an empty slot of the FIFO buffer 380 responsive to the apparatus receiving the transaction requesting access to a backbone. Such an apparatus further includes a FIFO buffer read port 385 to read the decoded routing destination information and the transaction from the FIFO buffer 380 and logic to route the transaction for local processing or to present the transaction to a backbone for processing based on the decoded routing destination information read from the FIFO buffer 380 with the transaction.

In one embodiment, an apparatus further includes a pointer incrementer 365 to increment a Load Pointer to cause the Load Pointer to point to a next one of the plurality of entry slots in the FIFO buffer subsequent to the FIFO buffer write port writing the received transaction and the decoded routing destination information into the empty slot of the FIFO buffer 380.

In one embodiment, an apparatus further includes a pointer incrementer 365 to increment a Grant Unload Pointer to cause the Grant Unload Pointer to point to a next populated one of the plurality of entry slots in the FIFO buffer 380 subsequent to the FIFO buffer read port 385 reading the decoded routing destination information and the transaction from the FIFO buffer 380.

In one embodiment, an apparatus further includes a free calculator to determine whether the FIFO buffer 380 has an empty entry slot capable to receive and buffer a new received transaction. In such an embodiment, the FIFO buffer write port 375 is to write the received transaction and the decoded routing destination information into the empty slot when the FIFO buffer is determined by the free calculator to have the empty slot.

In one embodiment, an apparatus further includes a de-pipelining mechanism to determine there are no outstanding transactions yet to be granted by the backbone based on a Request Unload Pointer and a Grant Unload Pointer being equal. In such an embodiment, the de-pipelining mechanism is to further de-pipeline the received transaction when there are determined to be no outstanding transactions yet to be granted by the backbone. In such an embodiment, the de-pipelining mechanism is to further consume the received transaction locally without engaging the backbone.

In one embodiment the apparatus is a transaction handling unit 301. In accordance with one embodiment, a system implements or incorporates the transaction handling unit 301. For example, in one embodiment, such a system includes a display (e.g., such as user interface 510 at FIG. 5) and further includes the transaction handling unit 301, in which the transaction handling unit 301 itself includes a First-In-First-Out (FIFO) buffer 380 implemented via a memory local to the transaction handling unit 301 of the apparatus or incorporated into the system, in which the FIFO buffer 380 has a plurality of entry slots. Such an apparatus further includes a FIFO buffer write port 375 to write a received transaction and routing destination information decoded from the received transaction into an empty slot of the FIFO buffer 380 responsive to the apparatus receiving the transaction requesting access to a backbone. Such an apparatus further includes a FIFO buffer read port 385 to read the decoded routing destination information and the transaction from the FIFO buffer 380 and logic to route the transaction for local processing or to present the transaction to a backbone for processing based on the decoded routing destination information read from the FIFO buffer 380 with the transaction.

In one embodiment, an agent 335 within each of a plurality of peripheral devices is to communicate a transaction to the transaction handling unit 301 for presentment to a backbone of the system, such as the system backbone 315 set forth at FIG. 3. In other embodiments, the agent 335 passes a transaction to the transaction handling unit 301 for presentment to a backbone of the system, the transaction handling unit 301 de-pipelines the transaction and consumes the transaction locally without engaging the backbone 315.

FIG. 4 is a flow diagram illustrating a method 400 for enabling an agent interfacing with a pipelined backbone to locally handle transactions while obeying an ordering rule in accordance with disclosed embodiments, including processing some incoming transactions through ordinary presentment to a backbone and processing other incoming transactions via local handling which does not engage the backbone and nevertheless adheres or obeys a stipulated ordering rule that all transactions be processed in the order in which they are received, etc. Method 400 may be performed by processing logic that may include hardware (e.g., circuitry, dedicated logic, programmable logic, microcode, etc.), software (e.g., instructions run on a processing device to perform various operations such communicating requests, grants, determining routing destination information, comparator operations, etc.), in pursuance of enabling an agent interfacing with a pipelined backbone to locally handle transactions while obeying an ordering rule. In one embodiment, method 400 is performed by a hardware based system, such as system 300 set forth at FIG. 3. Some operations may be performed by a transaction handling unit 301 as that which is shown within system 300 of FIG. 3. Some of the blocks and/or operations listed below are optional in accordance with certain embodiments. The numbering of the blocks presented is for the sake of clarity and is not intended to prescribe an order of operations in which the various blocks must occur.

Method 400 begins with processing logic that waits for a new transaction to be received (block 405).

At block 410, processing logic receives a transaction which requests access to a backbone. At block 415, processing logic determines whether the FIFO buffer has an empty entry slot capable to receive and buffer a new incoming transaction.

At block 420, processing logic decodes routing destination information from the transaction received, in which the decoded routing destination information designates the transaction to be processed either locally or processed via the backbone.

At block 425, processing logic stores the decoded routing destination information and the transaction into a First-In-First-Out (FIFO) buffer.

At block 430, processing logic increments a Load Pointer to cause the Load Pointer to point to a next one of the plurality of entry slots in the FIFO buffer responsive to the storing.

At block 435, processing logic retrieves the decoded routing destination information and the transaction from the FIFO buffer.

At block 440, processing logic processes the transaction via the backbone by retrieving a command and data for processing the transaction and communicating the command and the data for processing the transaction to the backbone.

At block 445, processing logic determines there are no outstanding transactions yet to be granted by the backbone based on a Request Unload Pointer and a Grant Unload Pointer being equal.

At block 450, processing logic process the transaction locally by de-pipelining the received transaction when there are determined to be no outstanding transactions yet to be granted by the backbone consuming the received transaction locally without engaging the backbone.

At block 455, processing logic increments a Grant Unload Pointer and a Request Unload Pointer to cause each Pointer to point to a next one of the plurality of entry slots in the FIFO buffer responsive to the reading.

FIG. 5 illustrates a diagrammatic representation of a machine 500 in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drive), which communicate with each other via a backbone 530. Main memory 504 includes entities issuing requests for processing via a pipelined backbone 524, for example, requesting transactions or resources available via a backbone. Main memory 504 further includes an agent 523 for communicating requests to a backbone via the transaction handling unit 534. Main memory 504 and its sub-elements (e.g. 523 and 524) are operable in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.). The computer system 500 may further include the transaction handling unit 534 to perform operations including receiving and buffering incoming requests, enforcing order to obey an ordering rule as required by, for example, a backbone which is to process such request, determining routing destination information for each requests, appropriately routing to a backbone or enabling local handling of such requests, and so forth, in accordance with the described embodiments.

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:
   receiving a transaction which requests access to a backbone;
   decoding routing destination information from the transaction received, wherein the decoded routing destination information designates the transaction to be processed either locally or processed via the backbone;
   storing the decoded routing destination information and the transaction into a First-In-First-Out (FIFO) buffer;
   retrieving the decoded routing destination information and the transaction from the FIFO buffer;
   processing the transaction locally or via the backbone based on the decoded routing destination information retrieved from the FIFO buffer with the transaction, wherein processing the transaction locally includes determining the transaction does not require routing to the backbone based on the decoded routing destination information and presenting the transaction to a local handler without engaging the backbone; and
   wherein consuming the transaction locally comprises one of: discarding the received transaction as an unsupported transaction without the received transaction being sent to a target through the backbone and consuming the received transaction by an agent which initiated the received transaction without directing the received transaction to the target through the backbone.

2. The method of claim 1, wherein receiving the transaction which requests access to the backbone comprises receiving the transaction at a transaction handler from an agent communicatively interfaced with the transaction handler, wherein the agent resides within one of:
   a PCI Express attached device issuing the transaction to the transaction handler for presentment to the backbone;
   a serial ATA attached device issuing the transaction to the transaction handler for presentment to the backbone;
   a Platform Controller Hub attached device issuing the transaction to the transaction handler for presentment to the backbone; and
   a Direct Media Interface (DMI) attached device issuing the transaction to the transaction handler for presentment to the backbone.

3. The method of claim 1, wherein the FIFO buffer comprises a memory having a plurality of entry slots, wherein each of the plurality of entry slots stores a respective routing destination information entry and a corresponding received transaction for each of a plurality of incoming transactions received.

4. The method of claim 1:
   wherein storing the decoded routing destination information and the transaction into the FIFO buffer comprises writing the decoded routing destination information and the transaction into one of a plurality of entry slots in the FIFO buffer; and
   responsively incrementing a Load Pointer to cause the Load Pointer to point to a next one of the plurality of entry slots in the FIFO buffer.

5. The method of claim 1:
   wherein retrieving the decoded routing destination information and the transaction from the FIFO buffer comprises reading the decoded routing destination information and the transaction from one of a plurality of entry slots in the FIFO buffer; and
   responsively incrementing a Grant Unload Pointer to cause the Grant Unload Pointer to point to a next populated one of the plurality of entry slots in the FIFO buffer.

6. The method of claim 1, further comprising:
   determining, via a free calculator, whether the FIFO buffer has an empty entry slot capable to receive and buffer a new incoming transaction; and
   wherein storing the decoded routing destination information and the transaction into the FIFO buffer comprises storing the decoded routing destination information and the transaction into the FIFO buffer and into the empty slot of the FIFO buffer when the FIFO buffer is determined to have the empty slot.

7. The method of claim 1, wherein processing the transaction via the backbone comprises:
   retrieving a command and data for processing the transaction; and
   communicating the command and the data for processing the transaction to the backbone; and
   incrementing a Request Unload Pointer to point to a next populated one of a plurality of entry slots in the FIFO buffer.

8. A method comprising:
   receiving a transaction which requests access to a backbone;
   decoding routing destination information from the transaction received, wherein the decoded routing destination information designates the transaction to be processed either locally or processed via the backbone;

storing the decoded routing destination information and the transaction into a First-In-First-Out (FIFO) buffer;

retrieving the decoded routing destination information and the transaction from the FIFO buffer;

processing the transaction locally or via the backbone based on the decoded routing destination information retrieved from the FIFO buffer with the transaction, wherein processing the transaction locally includes determining the transaction does not require routing to the backbone based on the decoded routing destination information and presenting the transaction to a local handler without engaging the backbone; and wherein processing the transaction locally further comprises: determining there are no outstanding transactions yet to be granted by the backbone based on a Request Unload Pointer and a Grant Unload Pointer being equal, de-pipelining the received transaction when there are determined to be no outstanding transactions yet to be granted by the backbone, and consuming the received transaction locally without engaging the backbone.

9. The method of claim 8, wherein consuming the transaction locally comprises one of:

discarding the received transaction as an unsupported transaction without the received transaction being sent to a target through the backbone; and consuming the received transaction by an agent which initiated the received transaction without directing the received transaction to the target through the backbone.

10. A method comprising:

receiving a transaction which requests access to a backbone;

decoding routing destination information from the transaction received, wherein the decoded routing destination information designates the transaction to be processed either locally or processed via the backbone;

storing the decoded routing destination information and the transaction into a First-In-First-Out (FIFO) buffer;

retrieving the decoded routing destination information and the transaction from the FIFO buffer;

processing the transaction locally or via the backbone based on the decoded routing destination information retrieved from the FIFO buffer with the transaction;

wherein the method further comprises:

receiving the transaction via a first agent among a plurality of agents in which the transaction specifies a command and data to be processed via the backbone;

receiving a second transaction via a second agent among the plurality of agents in which the second transaction specifies a second command and second data to be processed via the backbone; and writing, via a de-pipelining mechanism, a load pointer into the FIFO buffer for each of the first transaction and the second transaction in the order in which the first and second transactions are received, and wherein the de-pipelining mechanism forces the first transaction and the second transaction to be processed locally or via the backbone in the order the first transaction and the second transaction are received by the de-pipelining mechanism regardless of the routing destination information associated with each of the first and second transactions.

11. An apparatus comprising:

a memory comprising a First-In-First-Out (FIFO) buffer, the FIFO buffer having a plurality of entry slots;

a FIFO buffer write port to write a received transaction and routing destination information decoded from the received transaction into an empty slot of the FIFO buffer responsive to the apparatus receiving the transaction requesting access to a backbone;

a FIFO buffer read port to read the decoded routing destination information and the transaction from the FIFO buffer;

logic to route the transaction for local processing or to present the transaction to a backbone for processing based on the decoded routing destination information read from the FIFO buffer with the transaction; and a de-pipelining mechanism to: determine there are no outstanding transactions yet to be granted by the backbone based on a Request Unload Pointer and a Grant Unload Pointer being equal, de-pipeline the received transaction when there are determined to be no outstanding transactions yet to be granted by the backbone, and consume the received transaction locally without engaging the backbone.

12. The apparatus of claim 11, further comprising:

a pointer incrementer to increment a Load Pointer to cause the Load Pointer to point to a next one of the plurality of entry slots in the FIFO buffer subsequent to the FIFO buffer write port writing the received transaction and the decoded routing destination information into the empty slot of the FIFO buffer.

13. The apparatus of claim 12, further comprising:

the pointer incrementer to increment a Grant Unload Pointer to cause the Grant Unload Pointer to point to a next populated one of the plurality of entry slots in the FIFO buffer subsequent to the FIFO buffer read port reading the decoded routing destination information and the transaction from the FIFO buffer.

14. The apparatus of claim 11, further comprising:

a free calculator to determine whether the FIFO buffer has an empty entry slot capable to receive and buffer a new received transaction; and wherein the FIFO buffer write port to write the received transaction and the decoded routing destination information into the empty slot of the FIFO buffer comprises the FIFO buffer write port to write the received transaction and the decoded routing destination information into the empty slot when the FIFO buffer is determined by the free calculator to have the empty slot.

15. The apparatus of claim 11, wherein the apparatus is a transaction handling unit and further wherein a plurality of agents issue transactions to the transaction handling unit, wherein each of the plurality of agents reside within one of:

a PCI Express attached device issuing the transaction to the transaction handling unit for presentment to the backbone;

a serial ATA attached device issuing the transaction to the transaction handling unit for presentment to the backbone;

a Platform Controller Hub attached device issuing the transaction to the transaction handling unit for presentment to the backbone; and a Direct Media Interface (DMI) attached device issuing the transaction to the transaction handling unit for presentment to the backbone.

16. A system comprising:

a display; and a transaction handling unit, wherein the transaction handling unit comprises:

a memory comprising a First-In-First-Out (FIFO) buffer, the FIFO buffer having a plurality of entry slots;

a FIFO buffer write port to write a received transaction and routing destination information decoded from the received transaction into an empty slot of the FIFO buffer responsive to the apparatus receiving the transaction requesting access to a backbone;

a FIFO buffer read port to read the decoded routing destination information and the transaction from the FIFO buffer;

logic to route the transaction for local processing or to present the transaction to a backbone for processing based on the decoded routing destination information read from the FIFO buffer with the transaction; and a de-pipelining mechanism to: determine there are no outstanding transactions yet to be granted by the backbone based on a Request Unload Pointer and a Grant Unload Pointer being equal, de-pipeline the received transaction when there are determined to be no outstanding transactions yet to be granted by the backbone, and consume the received transaction locally without engaging the backbone.

17. The system of claim 16, further comprising:

an agent to receive the transaction from a peripheral device and to communicate the transaction to the transaction handling unit for presentment to a backbone of the system.

18. The system of claim 16, further comprising:

one or more peripheral devices, each having an agent to issue transactions for presentment to a backbone of the system through the transaction handling unit, each transaction requesting access to resources available via the backbone; and wherein each of the one or more peripheral devices comprise one of:

a PCI Express attached device issuing the transaction to the transaction handling unit for presentment to the backbone;

a serial ATA attached device issuing the transaction to the transaction handling unit for presentment to the backbone;

a Platform Controller Hub attached device issuing the transaction to the transaction handling unit for presentment to the backbone; and a Direct Media Interface (DMI) attached device issuing the transaction to the transaction handling unit for presentment to the backbone.

\* \* \* \* \*